(12) United States Patent
Yu et al.

(10) Patent No.: US 12,352,877 B1
(45) Date of Patent: Jul. 8, 2025

(54) DYNAMIC TRIANGULATION OF ACTIVE USER EQUIPMENT LOCATION VIA SATELLITE RADIO ACCESS TECHNOLOGY (RAT)

(71) Applicant: AST & Science, LLC, Miami, FL (US)

(72) Inventors: Zhi Zhong Yu, Reading (GB); Federico Pedro Fawzi, Midland, TX (US)

(73) Assignee: AST & Science, LLC, Miami, FL (US)

( * ) Notice: Subject to any disclaimer, the term of this patent is extended or adjusted under 35 U.S.C. 154(b) by 328 days.

(21) Appl. No.: 17/860,249

(22) Filed: Jul. 8, 2022

Related U.S. Application Data

(60) Provisional application No. 63/219,667, filed on Jul. 8, 2021.

(51) Int. Cl.
*H04W 64/00* (2009.01)
*G01S 5/02* (2010.01)

(52) U.S. Cl.
CPC .......... *G01S 5/0249* (2020.05); *H04W 64/003* (2013.01)

(58) Field of Classification Search
CPC ........................... G01S 5/0249; H04W 64/003
USPC ........................................................ 455/456.1
See application file for complete search history.

(56) References Cited

U.S. PATENT DOCUMENTS

| | | | | |
|---|---|---|---|---|
| 5,412,388 A * | 5/1995 | Attwood | ............... | G01S 5/0246 701/470 |
| 5,955,986 A * | 9/1999 | Sullivan | .................... | G01S 5/12 342/357.68 |
| 6,078,284 A * | 6/2000 | Levanon | ............ | H04B 7/18554 455/12.1 |
| 6,107,959 A * | 8/2000 | Levanon | ............ | H04B 7/18554 455/12.1 |
| 6,246,361 B1 * | 6/2001 | Weill | .................... | G01S 5/0268 342/357.57 |
| 6,285,318 B1 * | 9/2001 | Schoen | ................. | G01S 5/0226 342/357.56 |
| 6,535,734 B1 * | 3/2003 | Miller | .................... | H01Q 1/125 455/12.1 |
| 2002/0070889 A1 * | 6/2002 | Griffin | ................. | G01S 5/0009 342/353 |
| 2003/0117319 A1 * | 6/2003 | Rideout | ................... | G01S 5/06 342/453 |
| 2004/0147222 A1 * | 7/2004 | Walsh | ...................... | H04B 7/19 455/12.1 |
| 2013/0023285 A1 * | 1/2013 | Markhovsky | ............. | G01S 3/74 455/456.1 |
| 2020/0053638 A1 * | 2/2020 | Edge | ...................... | H04W 88/14 |
| 2022/0018927 A1 * | 1/2022 | Wigard | ................. | G01S 5/0036 |
| 2022/0210612 A1 * | 6/2022 | Keating | .................. | G01S 11/02 |

* cited by examiner

*Primary Examiner* — Mark G. Pannell
(74) *Attorney, Agent, or Firm* — Botos Churchill IP Law LLP

(57) ABSTRACT

A ground station determines a location of a user equipment (UE) by triangulating signals from a single satellite at different times and positions as it orbits the earth. The ground station processing device determines a first pathlength between the UE and the satellite when the satellite is at a first position, and a second pathlength between the UE and the satellite when the satellite is at a second position. The ground station processing device triangulates an actual position of the UE based on the first pathlength and the second pathlength.

16 Claims, 3 Drawing Sheets

DYNAMIC TRIANGULATION OF ACTIVE USER EQUIPMENT LOCATION VIA SATELLITE RADIO ACCESS TECHNOLOGY (RAT)

CROSS-REFERENCE TO RELATED APPLICATIONS

This application claims the benefit of priority of U.S. Application Ser. No. 63/219,667, filed Jul. 8, 2021, the content of which is relied upon and incorporated herein by reference in its entirety.

BACKGROUND

The satcom radio access technology (sat RAT) or satcom radio access network (sat RAN) working with standard 2G (GSM), 4G (LTE) and 5G (NR) phones, normal User equipment (UE) is not specified in 3GPP specifications, let alone their locations. The details of finding the UE location have never been the focus, yet more and more significant applications called location-based services have been a long topic in 3GPP discussions. Some basic service regulators include the capability for knowing where the UEs are for E911 emergency calls, children tracking, criminal tracking, pet tracking, etc. Knowing an active UE location is a useful feature, especially for those UEs or devices that do not have required location sensors or simply are not capable of providing location information proactively.

SUMMARY

For sat RAT, finding an active UE location can be a satcom service provided to the UEs. Additionally, this concept can be flexible, as Rx beams can be enabled on a global scale in a few seconds. This could be useful for tracking specific targets within the satellite field of view (FoV). Satellites can be dynamically enabled to track any UE in a particular area. In emergency calls where UE do not have GPS or wifi to find its location, the satcom RAN based approach can tell where it is and automatically add that information to the e-call service center as it is a centric feature that does not rely on UE capability, and can track all of their locations and be able to pass the locations to UE (by SMS) and the rescue team when in such need. So does tracking of criminals where a phone number is enough to uniquely identify them.

Satellites that directly communicate with standard UEs on the ground is a new RAT. Satellites can bring with it another unique benefit of tracking active UEs location by just the serving satellite alone, which is the unique advantage satellite technology has over its complementary Terrestrial network. Satellite technology is simple, since only one satellite alone can work out the active UEs location it is currently serving. The UE don't have to rely on GPS, especially where there are no GPS signals. Sat RAN can use the timing information of the UEs' Tx signal, a by-product of the UL (uplink) signal process that is naturally available during active call of the UEs. In addition, satellite technology is quick, since the UE UL signal is the source for locating it can be as quick as tens of ms for a position fix, while GPS is 1 sec per fix. And, satellite technology is accurate, because it can be averaged over many UL radio blocks (RBs), each having 14 symbols hence 14 rough fix opportunities per ms in LTE. So, for good signal quality 0.5 meter can be achieved with large number of fixes from LEO satellite receiver of the UL signals.

A ground station determines a location of a user equipment (UE) by triangulating signals from a single satellite at different times and positions as it orbits the earth. The ground station processing device determines a first pathlength between the UE and the satellite when the satellite is at a first position, and a second pathlength between the UE and the satellite when the satellite is at a second position. The ground station processing device triangulates an actual position of the UE based on the first pathlength and the second pathlength.

BRIEF DESCRIPTION OF THE FIGURES

The accompanying drawings are incorporated in and constitute a part of this specification which describes the satellite and earth mobility that involves dynamic sequence of satellite locations while communicating with a UE. The delay normalisation and timing of the UL signals serve the finding of an active UE location. It is to be understood that the drawings illustrate only some examples of the disclosure and other examples or combinations of various examples that are not specifically illustrated in the figures may still fall within the scope of this disclosure. Examples will now be described with additional detail through the use of the drawings, in which.

DETAILED DESCRIPTION

Figure 1:
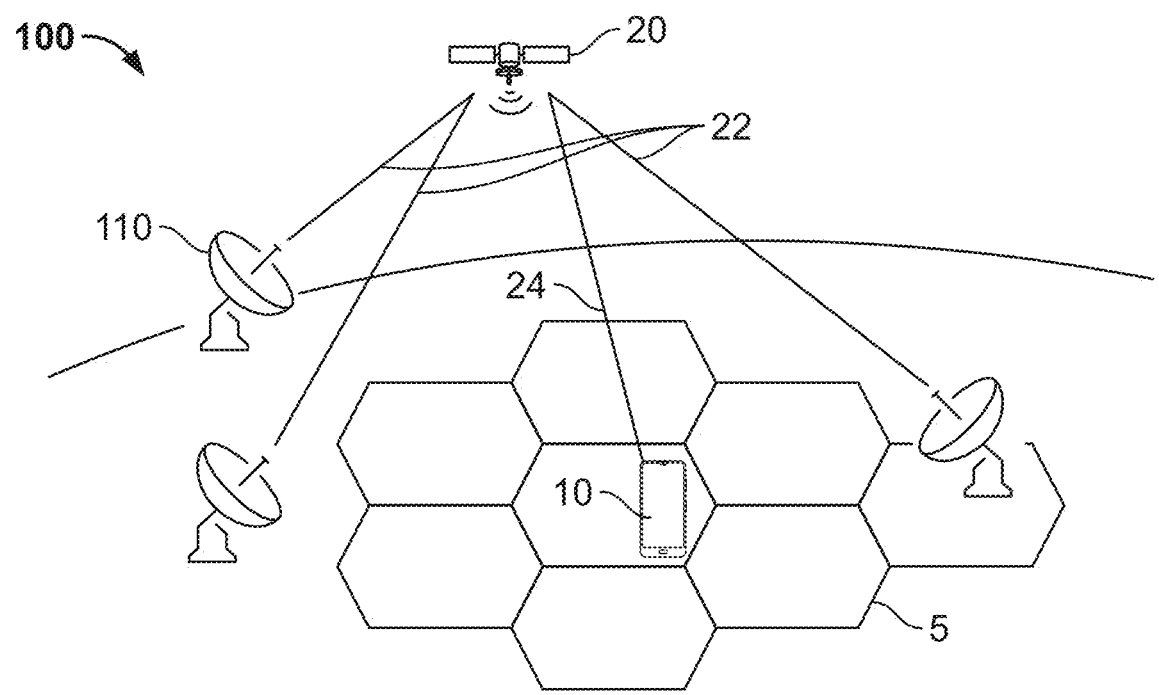
FIG. 1 is a diagram of determine the satellite location in sat RAT, dynamically changing its position on its orbit, which can be used as the dynamic reference for finding the UE location.

In describing the illustrative, non-limiting embodiments illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments are described for illustrative purposes, it being understood that the description and claims are not limited to the illustrated embodiments and other embodiments not specifically shown in the drawings may also be within the scope of this disclosure.

Referring to FIG. 1, the present disclosure is for a UE location system 100 having a satellite 20 and one or more ground stations 110. The ground stations can include a processing device, such as an eNodeB, and an antenna such as a tracking dish antenna. As shown, the satellite 20 has a footprint that includes a plurality of cells 5, and one or more UE are located within each cell 5. A ground station 110 can be located in each cell 5 or one ground station 110 can cover multiple cells 5. The ground stations 110 directly communicate with the satellite 20 over a first communication beam 22. The satellite 20 directly communicates with the UE 10 on Earth over a second communication beam 24.

A satellite 20 often has 3 GW (gateway) feeder links simultaneously, with 2 pathlength measurements from 2 ground stations and the satellite orbital plane (since it moves relative to the earth due to its self-rotation), and the current or instant accurate satellite dynamic location can be derived from the circular intersection points around the orbital plane. Satellite positions can be well predicted and monitored. Precision Time Protocol (PTP) can provide sub microsecond time accuracy. Further verifications can be achieved, and the satellite location can be accurately determined and its TLE (two-line element) data is then corrected. There are GPS data to confirm. The absolute accuracy can be 0.5-1 meter. The accurate satellite locations form the reference from which UE location can be found.

There are several embodiments to perform UE location (triangulation) by a satellite 20. Using three different beams from different satellites, 20 is one of them. But as we have accurate beam pointing and satellite position information in its orbit all the time, we can dynamically work out a UE position with its UL IQ signal timing over a few seconds, during that period the serving satellite 20 is in many different known locations 20a-20e, which is equivalent to triangulation with multiple beams from different satellites as the satellite has been in different locations to provide relevant timing information required. While the methodology and the result in both cases are similar, using one satellite in two or more different locations on the orbit, simplifies the operation and the use cases, also one serving satellite will be always available but in many cases three satellites may not.

Satellite location is known by TLE data and further accuracy of that is enabled by the first beam 22, from one or more of the ground stations 110 to the satellite 20. The direction of the first beam 22 is based on TLE data, which provides satellite rough location (which can be approximately a km off). Once the link on 22 is established, the GPS information from the satellite can be transmitted to the ground station 110, but they are slow, generally a fix per second. To provide UEs' location, the satellite location needs to be accurate enough and space and in time by interpolations and verified/corrected by a few means, so adjustment and correction can be continuously provided for the reference points in working out the UEs locations. This can be done, for example, by (a) a loopback signal which the GW 110 sends by the first beam 22 to know the satellite pathlength; (b) a beacon, received by two or more GWs on the ground to determine its accurate location; and/or (c) accuracy can increased with statistical data collected over a few seconds of each satellite location fix.

UE location can then be determined based on the accurate dynamic location of the serving satellite 20. This can be based on the UE to satellite pathlength delay, which is determined as a normalised delay minus the satellite to GW path delay. Such UE to satellite pathlength can be found along the orbit when the satellite 20 flies over the UE 10 being served, and UE 10 location can be found by further details shown in FIG. 2. Accuracy of the UE location can further optionally be increased with statistical data collected over a few seconds of each UE location fix with the knowledge of the timing advance (TA) being used, a command base station provides.

Figure 2:
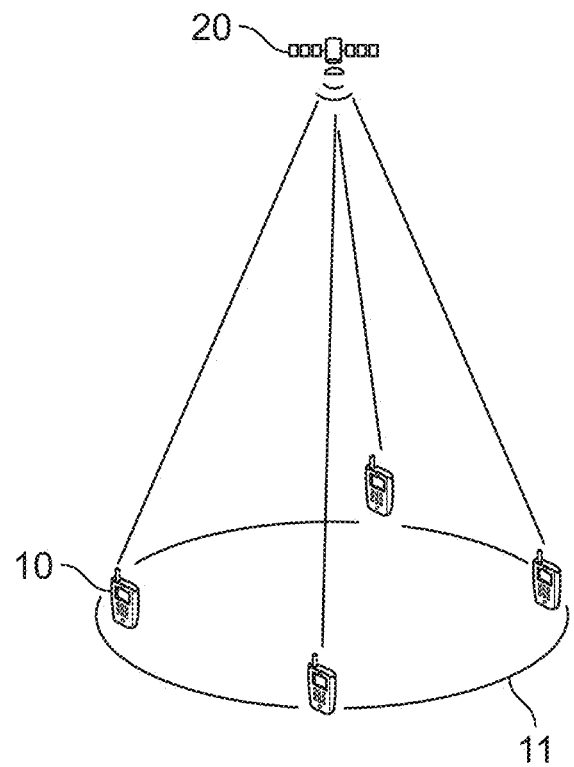
FIG. 2 is a diagram illustrating UE movement and additional procedure to get the moving UE dynamic location.
Figure 3:
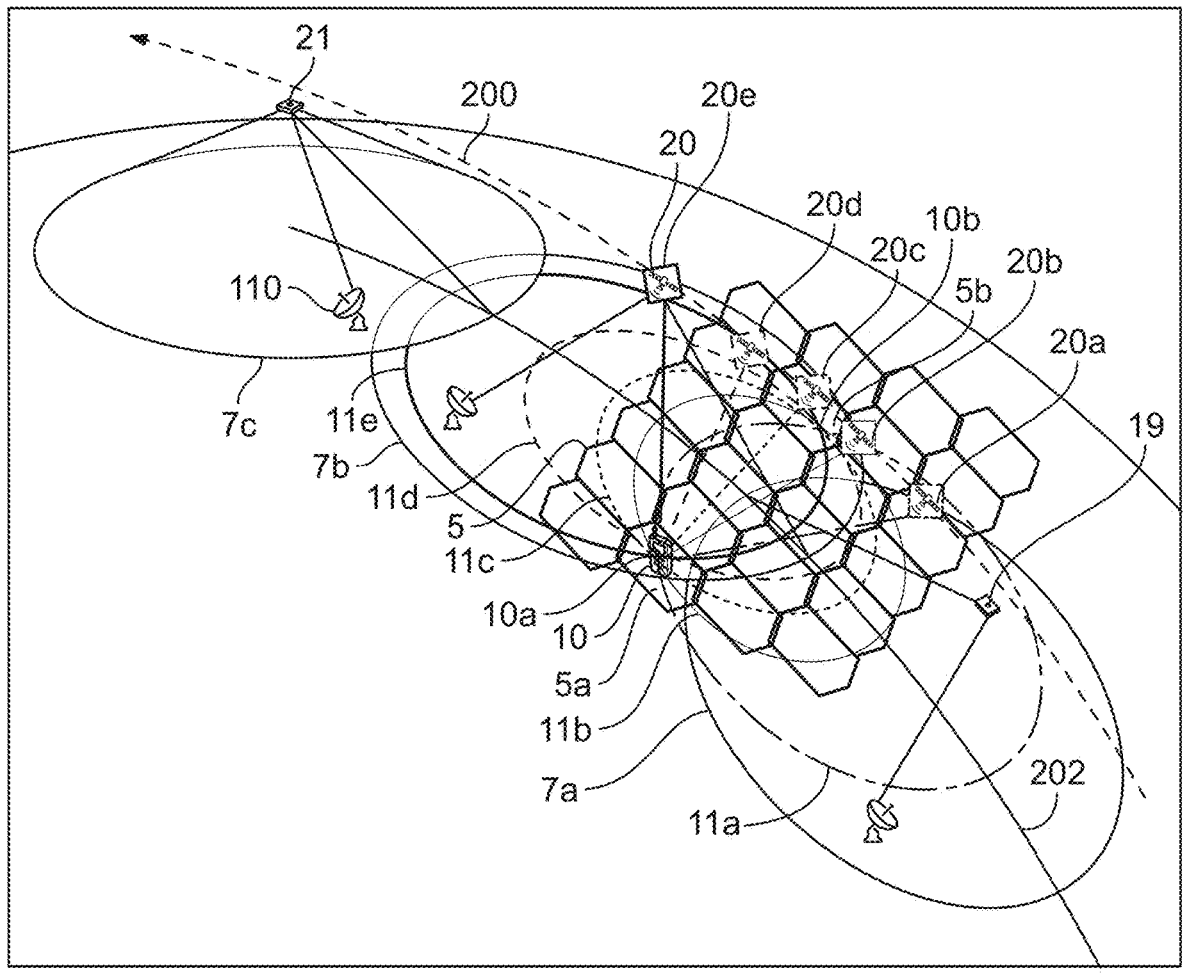
FIG. 3 is a diagram illustrating the sat RAT system layout from earth to space and illustrations of the mechanism for finding UE dynamic location.
Figure 4:
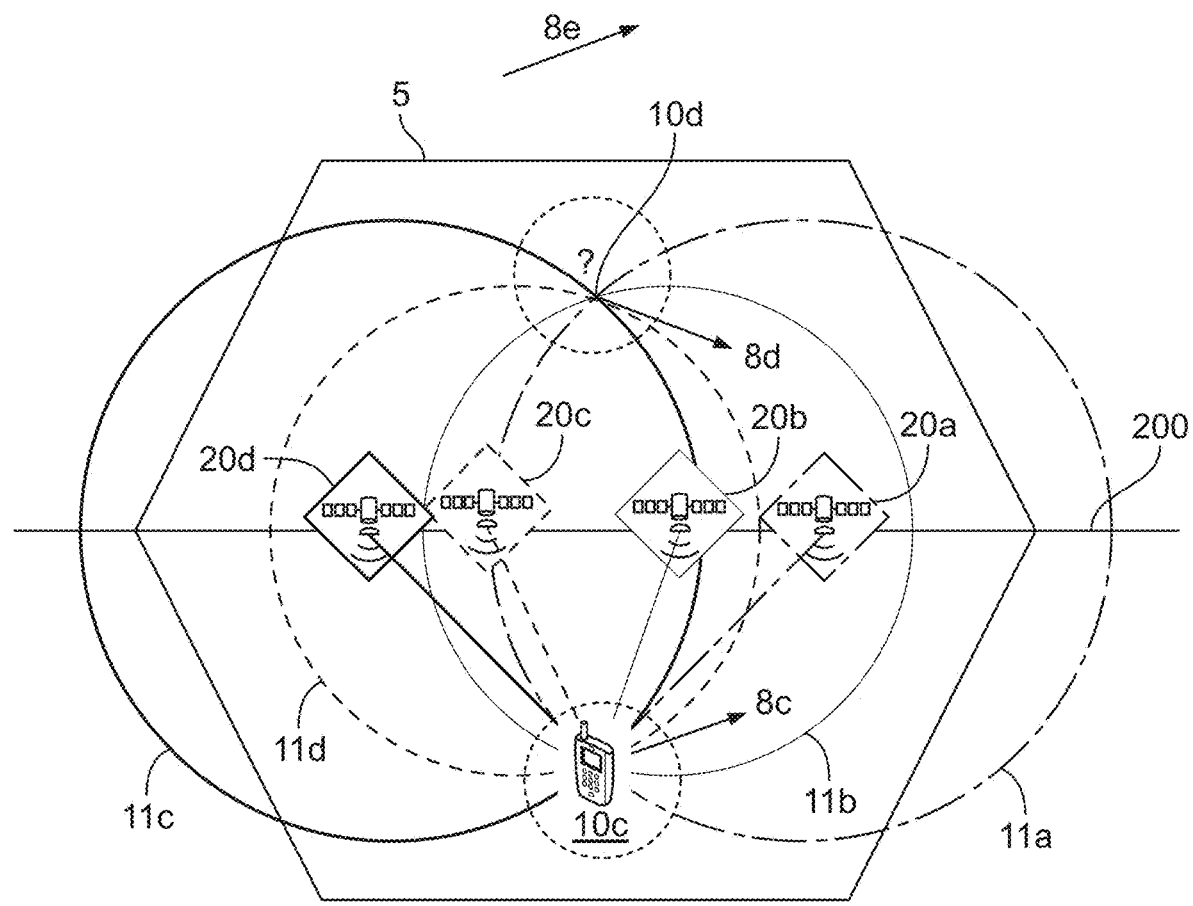
FIG. 4 is a diagram illustrating a specific case where additional earth self-rotation is considered in UE dynamic location detection.

FIGS. 2-4 illustrate how the system determines an active UE location for a UE 10 located within a satellite footprint or the satellite Field of View (FOV) 7. The FOV 7a is the FOV of the satellite in the most RHS indicated by the cone edge lines for FOVs 7a, 7b and 7c which are for the 3 satellites, 19, 20, 21 in that orbital plane at a snapshot. In the embodiment shown in FIG. 3, the satellite 20 is servicing the UE 10 in the cell 5 since the UE 10 is within the FOV 7b for that satellite 20. The satellite 21 has already passed the UE and may have previously serviced the UE 10, and the satellite 19 is the rising satellite that will service the UE 10 after the UE has passed out of the FOV 7b for the current servicing satellite 20 and into the FOV 7a for the rising satellite 19. The FOVs 7a, 7b, 7c continuously move with the respective satellite 19, 20, 21. The UE will communicate with a given satellite 19, 20, 21 for approximately 5.5 minutes before the satellite passes out of view. For UE location detection, the serving satellite 20 for that UE can use its detection points of 20a-e.

Referring to FIG. 2, the circle 11 indicates possible UE locations with the same pathlength of one measurement from one satellite known position. Turning to FIG. 3, on the orbit 200 satellites 19, 20 and 21 are shown. The location of the UE under concern is now served by satellite 20 and the UE is sending the UL signals, each burst of the signal takes different time to reach the satellite 20 due to different pathlength when satellite 20 orbiting at high speed. The UL signal delay time indicates possible location circles, and multiple such circles 11a-11e with different sizes intersect on the actual UE location 10a, making the UE location almost unique. Thus, in the example shown, the satellite 20 is at a first position 20a at a first time period, at which time the gateway station determines a first UE pathlength between the UE 10 and the satellite 20. Based on the first UE pathlength, the UE 10 can be at any number of positions along the first circle 11a. As the satellite 20 moves along its orbital path, it will then come to a second satellite position 20b. At the second satellite position 20b, the GWS determines the second UE pathlength from the satellite 20 to the UE 10, which will likely be different than the first UE pathlength. Based on the second UE pathlength, the UE 10 can be at any number of positions along the second circle 11b. Likewise, as the satellite 20 moves to a third position 20c, fourth position 20d, and fifth position 20e, the GWS determines a third, fourth and fifth UE pathlength, which can be along the third, fourth and fifth circles 11c, 11d, 11e, respectively. Thus, the system determines the UE location based on a triangulation of the possible locations at two or more of the circles 11a-11e.

One possible system configuration could be putting base stations together with the GWS 110, where the baseband signal processing and pathlength are accurately handled to sub-microsecond or nanosecond accuracy, from which determines the UE locations. The GW tracking dish 110 is a two-way feeder link for passing the DL and UL signals between the base stations and UEs, such as discussed for example in U.S. application Ser. Nos. 17/583,992 and 17/666,234, the entire contents of which are hereby incorporated by reference. The triangulation is performed when the UE is active, for example when the UE sends/transmits data to the satellite 20, such as location or tracking area update, a text, internet usage, or a phone call. During that transmission, the GWS 110 knows which beam the UE is communicating over, and therefore knows which cell 5 the UE is located in. However, it does not know the exact location of the UE within that cell 5. In other embodiments, the UE can be controlled by the GWS 110, the UE, or the satellite 20 to transmit at certain times to establish a location. Moreover, the RAN system can poll any idle UE for location or tracking area update without owner's active action at any time, making the UE location finding under the RAN control. This is particularly helpful in emergency rescue, criminal tracking, child or pet tracking.

Referring to FIG. 3, a single satellite 20 is shown making a number of measurements as it travels to various positions 20a-20d along its orbit, which are used to form a dynamic triangulation to narrow down two possible UE locations: (1)

if the two possible UE locations are in two cells, as FIG. 3 shows, eNB's cell mapping can resolve the real and symmetrical phantom UE location; and (2) if the UE is within a 48 km cell, as FIG. 4 shows, different patch array antennas can resolve them by the phase difference.

Accordingly, one feature of the system to provide satellite RAN to determine the location of the UEs, is to know the satellite dynamic position changes relative to the earth: i.e. we can control the satellite and monitor its real-time position in 3D space to 0.5 meters by multiple ground stations and GPS in general even with LEO satellite that flies at speed of 7.5 to 8 km/s. This is part of the satellite control and monitor system in the sat RAN, that forms the reference for finding the UEs' location dynamically.

Another feature of the system is the accurate measure of RF pathlength from UE to the serving satellite in real time. The delay normalisation is used to determine the RF pathlength to the cell centre on a millisecond basis (i.e., every millisecond. Then the residual latency caused by the distance from the cell centre to the individual UEs in 48 km-wide beam can be worked out by eNB timing adjustment, partly reflected by the TA, and most likely there is further fine details in the timing adjustment, which can further improve the distance estimation. Together with the delay to 4 ns granularity and the eNB's fine timing estimation (for TA) it determines the reliable circles 11 where UEs are each time an RB is received (1 ms), with the reference of the satellite and cells (Latitude, Longitude, Height) the GWS determines the series of circles with their center along the orbit perpendicular projection on to the earth surface, due to the orbit path of the satellites.

The implementation aspect of it differs with the system architecture: if it is O-RAN split 7-2x based then the Low PHY device can work it out, the dynamic changes of the timing can also be found from the phase in frequency domain, then High PHY block can also play a part.

Another feature of the system is the UEs location fixes in the way using single satellite always has two perspective solutions, generally the two as shown in FIG. 3 are unique if the factors are only from the fixed satellite Receiver configuration of the serving satellite, as the other one will be symmetric to the satellite orbital plane, two perspective solutions will be two symmetrical points of the orbital plane. Between the two solutions further factors are to be used and that will rely on the following two cases.

Referring to FIG. 3, a first issue is when the two possible UE locations are in different cells, which leads to an ambiguity of which of the two possible UE locations is correct. Here, the extra factor of the cell the UE is in the cells of the two options, have two different beams. This is suitable for the case when two perspective UE locations (i.e., positions 10a, 10b in FIG. 3) are more than a cell diameter, as the cell UE is in will uniquely identify which of the two is true UE location. This can occur when the UE is more than a certain distance (for example, for a beam frequency of 1 GHz, then the certain distance is 48 km or more; for 2 GHz frequency, the certain distance is 24 km) from the ground orbital path 202 of the satellite 20 (i.e., the ground orbital path 202 is directly under the satellite orbital path 200). In that situation where the two possible UE positions are in different cells, as shown in FIG. 3, the actual signal source location of the UE is clearly known since the UE position will be based on two beams. Each cell 5 is serviced by a single beam from one satellite 20. Accordingly, the actual UE location 10a is at the cell where the UE is transmitting using that given beam. That is, a UE located in a first cell 5a communicates over a first beam, and a UE in a second cell 5b communicates over a second beam. So, it is known that the actual location for the UE is at the first possible location 10a (in the first cell 5a) because the UE is known to be communicating over the first beam. It cannot be at the second possible location 10b (in the second cell 5b) because the UE is not communicating over the second beam.

Referring to FIG. 4, a second issue arises when the two perspective locations are within the same cell 5. This can occur when the UE is within the certain distances noted above (less than 48 km for 1 GHz frequency, or less than 24 km for 2 GHz frequency) from the satellite ground path 202, which can occur when the UE is directly below or close to the satellite orbital path 200, as shown in FIG. 4. When that happens, the two possible UE locations 10c, 10d will be within the same cell 5. As a result, the UE would be communicating over the that two symmetrical points that have the same beam. When this occurs, the earth self-rotation can be used to decide which one of the two possible locations 10c or 10d is correct. Assuming the UE is standing still, the two solutions should have opposite movement for the timing over the duration of satellite movement.

With the orbital plane information, the rate of such movement is known, and the difference of that change can uniquely identify the real solution of the UEs' location. For example, as shown in FIG. 4, the earth may be rotating in the earth rotation direction 8e, which an inclined direction (at an angle to the earth's equator, not parallel to the earth's equator). Accordingly, the proper UE location will also be moving (by virtue of the earth rotation) in a parallel or similar direction. Here, we show the proper UE location as 10c, since the UE direction 8c is in the same direction as the earth rotation direction 8e. And the other possible UE location 10d is moving in a different symmetrical direction 8d, which is not the same as the earth rotation direction 8e. Thus, the possible UE location 10d can be eliminated and the possible UE location 10c is determined to be the true location of the UE.

Another feature of the system 100 is the handling of UE location on the cells right on the equator and with equatorial only satellite. That is, when the earth rotation direction 8e is along the earth's equator. The above extra handling would not be able to distinguish for equatorial case, and further measure can be taken. To avoid such case, the easiest way is to plan the cell on either side of the equator so that the system is be able to tell that from the TRx beams with regard to the equator. However, in some cases, such as restrictions due to the TN cells or country boundary, cells may have to be on the equator and no such convenience then following approaches can be adopted: (a) Use the MIMO configuration with the north and south sides of the array to receive the UEs' signal and compare the phase difference to decide if the UEs are on the south or north side of the equator, so its location can be uniquely identified. And (b), when the constellation satellites become available, then a quick MIMO Rx from the two overlapping satellites can also be able to achieve that.

Another feature of the system 100 is the signal process flow for eNB and work out and record moving UE location path on the ground. That is, the system determines the UE's movement direction 8c.

1. The delay for the cell is the first parameter d.
2. Every time when eNB schedule the UE of interest a PUSCH or a PUCCH, work out the fractional timing changes and put into the statistics.
3. Work out the crossing points of the UE RF pathlength circles and find the common crossing points (e.g., 8c and 10c are common, whereas 8d and 10d are not common). There will always be two, but in reality, sometimes one of them is known not to be applicable if there are more than one cell diameter away from the orbital plane.
4. Over time UEs may move along a continuous line and that can be helpful to narrow down the possibilities to just focus on the one with UE possible dynamic move.
5. After taking the measurement eNB work together with delay normalisation unit and combine historical data to work out the UE traces.
6. eNB needs to know the beams and high layer UE RRC (Radio Resource Control) state, and linking them to the UE IDs (IMSI, MSISDN or other C-RANTIs, temporary IDs) then the user.
7. Timestamp is then put on the UE trace to complete the UE track records. Tracking can be enabled or disabled. When UEs are doing the cell HO its location info will be handovered to the new eNB.

Another feature of the system is the combination of the location-based service (LOS) data with the UEs, this can be user subscription, police lawful tracking of any UEs and Vendor/investors/operators' tests. The application layer like this is really driven by where the revenue come and user GUI for enabling and disabling and flexibility and capability of getting them together to accomplish the LOS that can be supported by this innovative approach fully taking the advantage of satellites technology.

Accordingly, the present disclosure has a system that is able to triangulate the location of a UE with a single satellite in most cases, with more satellites as an option when needed. And, without any added processing by the UE, including without the use of a Global Positioning System (GPS). And, the system operates using standard UEs, without any specialized software or operation.

A UE location service based single dynamic predictable LEO satellite path as reference points in triangulation using sat RAT UE any uplink signal, including but not limited to LTE, GSM and new radio. The service uses a series of single satellite positions on its predictable paths, multiple satellite receiving beams, UL grant to identify particular UEs' signals. Using of time domain and frequency domain information of the UL signal to get the UE RF pathlength in order to determine the UEs location. Accurate satellite position control and monitoring, and the separation of the feeder link time with the service link, and using the ground stations' feeder links' RF path information for the satellite position control and monitoring and correction on top of TLE data. The service combines the delay normalisation and eNB timing estimate to provide location services, and uses the antenna array beam orientation to distinguish north from south in the Equatorial case. The service further uses three satellites for the triangulation as an alternative method. The satellites receive beam dynamically enabled for specific UE target location. Cell planning with the equator on cell boundary in order to avoid sophisticated approach of distinguishing two possible UE locations that is symmetrical to the equator. Attaching the UE location info to the emergency call automatically from NMO operation to have additional added-value in satcom to normal UE services. The interface control elements that enable the UE location searching, identifying and fixing the UE location. The mechanism of enabling the Rx beams for UE location finding task. The service that enables searching the UE location in any cell of any satellite from any ground station in searching of a particular UE, including the use of polling any idle UE for location or tracking area update, SMS/Messaging services, voice calls, paging, ping, whatsapp messaging, video, wechat etc.

In the embodiments shown, the gateway or ground station can include a processing device to perform various functions and operations in accordance with the invention, such as the eNodeB, including the beam pathlength, possible UE locations, and the determined UE location. In other embodiments, the processing device can be located at the RAN system, for example at the UE and/or at the satellite, to conduct the operations described herein. The processing device can be, for instance, a computing device, processor, or controller. The processing device can be provided with one or more of a wide variety of components or subsystems including, for example, wired or wireless communication links, and/or storage device(s) such as analogue or digital memory or a database. All or parts of the system, processes, and/or data utilized in the invention can be stored on or read from the storage device. The processing device can execute software that can be stored on the storage device. Unless indicated otherwise, the process is implemented in automatically and dynamically by the processor substantially in real time without delay.

The invention claimed is:

1. A system for determining a location of a user equipment (UE), comprising:
a processing device configured to determine a first pathlength between the UE and a satellite when the satellite is at a first position, and a second pathlength between the UE and the satellite when the satellite is at a second position;
wherein:
the processing device is further configured to triangulate an actual position of the UE based on the first pathlength and the second pathlength; and
the processing device is configured to combine delay normalisation and eNB timing estimate to provide a location of the UE.

2. The system of claim 1, wherein said processing device is at a base station.

3. The system of claim 1, wherein said processing device operates dynamically as the satellite moves from the first position to the second position.

4. The system of claim 1, wherein the satellite is in Low Earth Orbit.

5. The system of claim 1, wherein said processing device uses satellite Radio Access Technology.

6. The system of claim 1, wherein the UE uses any uplink signal.

7. The system of claim 6, wherein the uplink signal comprises LTE, GSM or new radio.

8. The system of claim 1, wherein the satellite is on a predetermined known orbital path.

9. The system of claim 1, wherein the satellite has a field of view with a plurality of cells, each of the plurality of cells associated with a respective beam over which UEs in that cell communicate with the satellite.

10. The system of claim 1, comprising using of time domain and frequency domain information of an uplink signal to get the UE RF pathlength to determine the UEs location.

11. The system of claim 1, wherein the satellite is in direct communication with the UE.

12. The system of claim 1, said processing device triangulating two possible positions of the UE based on the first pathlength and the second pathlength and, when the two possible positions are in different communication cells, determining which of the two possible positions is the actual position of the UE based on a beam over which the UE communicates.

13. The system of claim 1, said processing device triangulating two possible positions of the UE based on the first pathlength and the second pathlength and, when the two possible positions are in a same communication cell, determining which of the two possible positions is the actual position of the UE based on a travel direction for each of the two possible positions compared with an earth rotation direction.

14. The system of claim 1, wherein the satellite comprises no more than one satellite.

15. The system of claim 1, wherein said processing device comprises an eNodeB.

16. The system of claim 1, wherein the first pathlength is for a first signal communicated between the satellite and the UE, and the second pathlength is for a second signal communicated between the satellite and the UE.

\* \* \* \* \*